United States Patent
Molson

(10) Patent No.: US 10,866,278 B2
(45) Date of Patent: Dec. 15, 2020

(54) METHODS AND APPARATUS FOR PERFORMING DESIGN FOR DEBUG VIA PROTOCOL INTERFACE

(71) Applicant: Intel Corporation, Santa Clara, CA (US)

(72) Inventor: Philippe Molson, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 27 days.

(21) Appl. No.: 16/368,709

(22) Filed: Mar. 28, 2019

(65) Prior Publication Data

US 2019/0219635 A1 Jul. 18, 2019

(51) Int. Cl.
  G01R 31/00 (2006.01)
  G01R 31/317 (2006.01)
  G01R 31/3177 (2006.01)
  G06F 21/57 (2013.01)
  G06F 9/4401 (2018.01)
  G06F 13/42 (2006.01)

(52) U.S. Cl.
  CPC ... *G01R 31/31704* (2013.01); *G01R 31/3177* (2013.01); *G01R 31/31705* (2013.01); *G06F 9/4401* (2013.01); *G06F 13/4282* (2013.01); *G06F 13/4295* (2013.01); *G06F 21/575* (2013.01); *G06F 2213/0026* (2013.01); *G06F 2221/034* (2013.01)

(58) Field of Classification Search
  None
  See application file for complete search history.

(56) References Cited

U.S. PATENT DOCUMENTS

| 2,528,824 A | 10/1998 | Swoboda |
| 7,152,136 B1 | 12/2006 | Charagulla |
| 7,392,437 B2 | 6/2008 | Bowlby et al. |

(Continued)

OTHER PUBLICATIONS

G. J. Van Rootselaar and B. Vermeulen, "Silicon debug: scan chains alone are not enough," International Test Conference 1999. Proceedings (IEEE Cat. No. 99CH37034), Atlantic City, NJ, USA, 1999, pp. 892-902, doi: 10.1109/TEST.1999.805821. (Year: 1999).*

(Continued)

*Primary Examiner* — Daniel F. McMahon
(74) *Attorney, Agent, or Firm* — Treyz Law Group, P.C.; Jason Tsai

(57) ABSTRACT

A test system is provided for performing design for debug (DFD) operations. The test system includes a host processor coupled to an auxiliary device. The auxiliary device includes a protocol interface block for communicating with the host processor during normal functional mode. The auxiliary device further includes a circuit under test (CUT) and a hardened DFD hub that is controlled by the host processor via the protocol interface block. The DFD hub includes a DFD triggering component, a DFD tracing component, and a DFD access component. The host processor directs the DFD hub to perform DFD operations by sending control signals through the protocol interface block during a debugging mode. Test information gathered using the DFD hub is fed back to the host processor to help facilitate silicon bring-up, pre-production software stack optimization, and post-production performance metric monitoring.

19 Claims, 8 Drawing Sheets

(56) References Cited

U.S. PATENT DOCUMENTS

| | | | |
|---|---|---|---|
| 7,478,346 | B2 | 1/2009 | Hsu et al. |
| 7,921,346 | B2 | 4/2011 | Forlenza et al. |
| 7,962,808 | B2 | 6/2011 | Li |
| 8,983,790 | B1 * | 3/2015 | Merugu ............ G01R 31/31705 702/117 |
| 9,047,427 | B1 | 6/2015 | Doucet et al. |
| 10,078,113 | B1 * | 9/2018 | Usgaonkar ............ G06F 11/322 |
| 2004/0225974 | A1 | 11/2004 | Johnson |
| 2004/0243334 | A1 | 12/2004 | Wrigley et al. |
| 2006/0123298 | A1 | 6/2006 | Tseng |
| 2006/0282586 | A1 | 12/2006 | Shibuya |
| 2010/0153799 | A1 | 6/2010 | Maroni et al. |
| 2014/0344960 | A1 * | 11/2014 | Adams .................... G06F 21/57 726/34 |
| 2015/0127983 | A1 | 5/2015 | Trobough et al. |
| 2015/0149843 | A1 | 5/2015 | Finan |
| 2016/0070486 | A1 | 3/2016 | Anderson et al. |
| 2016/0202320 | A1 | 7/2016 | Natarajan |
| 2017/0299655 | A1 | 10/2017 | Deutsch et al. |
| 2018/0188321 | A1 * | 7/2018 | Pappu ............... G01R 31/31724 |
| 2019/0034367 | A1 * | 1/2019 | Kakaiya ................ G06F 13/404 |
| 2019/0042329 | A1 * | 2/2019 | Kakaiya ................ G06F 9/5027 |
| 2019/0103872 | A1 * | 4/2019 | Clark ............... H03K 19/17708 |

OTHER PUBLICATIONS

Morris et al. "PHY Interface for the PCI Express Architecture," Intel Corporation, 2007 (38 pages) [Retrieved on Mar. 28, 2019]. Retrieved from the Internet:<URL: http://www.applistar.com/wp-content/uploads/apps/pipe2_00.pdf>.

"PCI Express," Wikipedia, the free encyclopedia (26 pages) [Retrieved on Mar. 28, 2019]. Retrieved from the Internet: <URL: http://en.wikipedia.org/wiki/PCI_Express>.

Intel Corporation "PHY Interface for the PCI Express Architecture," Intel Corporation, Aug. 2008 (45 pages) [Retrieved on Feb. 19, 2014]. Retrieved from the Internet:<URL: http://www.csit-sun.pub.ro/~cpop/Documentatie_SM/Standarde_magistrale/PCIexpress/PIPE_PCIE_3_0.pdf>.

Nassar, F., et al. "Design and Simulation of a PCI Express based Embedded System" Autrochip, pp. 73-78 (2008) (Year 2008).

Hyun, E. & Seong, K. "Design and Verification for PCI Express Controller" IEEE 3rd Int'l Conf. on Information Tech. & Applications (2005) (Year: 2005).

Kudlugi, M., et al. "A Transaction-Based Unified Simulation/Emulation Architecture for Functional Verification" DAC 2001, pp. 623-628 (2001)(Year:2001).

* cited by examiner

METHODS AND APPARATUS FOR PERFORMING DESIGN FOR DEBUG VIA PROTOCOL INTERFACE

BACKGROUND

This relates to integrated circuits and more particularly, to ways for debugging integrated circuits.

There are two main forms of debugging an integrated circuit. A first form of integrated circuit validation includes structural/manufacturing testing, which involves checking whether or not the circuit has been assembled correctly from low-level building blocks with no direct attempt to determine if the overall functionality of the circuit is correct. Types of structural tests include Design for Test (DFT), which adds testability features to a hardware product design, automatic test pattern generation, memory built-in self-test (BIST), and JTAG (Joint Test Action Group) boundary scan.

A second form of integrated circuit validation includes functional testing, which attempts to debug the circuit according to its functional specifications (i.e., to determine its register transfer level and software/firmware level correctness). Design for Debug (DFD) is a validation mechanism configured to complement the functional testing of an integrated circuit device. At times when conventional functional testing is insufficient to isolate the root cause of failure, DFD circuitry can be used to help pinpoint the actual cause of failure.

As the cost of silicon continues to drop due to modern day advancements in processing technology, the cost of testing (on the other hand) continues to rise and may even exceed manufacturing costs. In an effort to help reduce test cost, hardwired test logic have been introduced on integrated circuits to aid in silicon bring-up through manufacturing tests and field debug.

It is within this context that the embodiments described herein arise.

DETAILED DESCRIPTION

The present embodiments relate to an improved circuit hardware infrastructure that leverages a hardened protocol stack such as the PCIe (Peripheral Component Interconnect Express) interface or the Ethernet interface to facilitate triage and debugging from early silicon bring-up through end customer device production deployment. In particular, an integrated circuit die that includes the hardened protocol stack may use the hardened protocol stack to communicate with a host processor via a data bus. That data bus can be extended to not only stream data between the host processor and the auxiliary die for normal function or configuration purposes, but also to stream data for debugging purposes (e.g., for Design of Debug or "DFD" purposes).

For example, a hardened PCIe block that already supports the configuration of the auxiliary die (a process sometimes referred to as Configuration via Protocol or "CVP") can borrow and reuse a large portion of the existing CVP infrastructure to support DFD operations (a process sometimes referred to herein as DFD via Protocol or "DVP"). The PCIe host application should have the capability to drive all phases of a given DFD session.

Performing debugging operations in this way improves computer technology by removing the need to add dedicated DFD connectors such as JTAG or I2C input-output (I/O) pins. In particular, the auxiliary die under test may also include a built-in hardened DFD controller (sometimes referred to as a "DFD hub"), which enables remote DFD access on the auxiliary die without requiring additional FPGA fabric to control the DFD operations. It will be recognized by one skilled in the art, that the present exemplary embodiments may be practiced without some or all of these specific details. In other instances, well-known operations have not been described in detail in order not to unnecessarily obscure the present embodiments.

Figure 1:
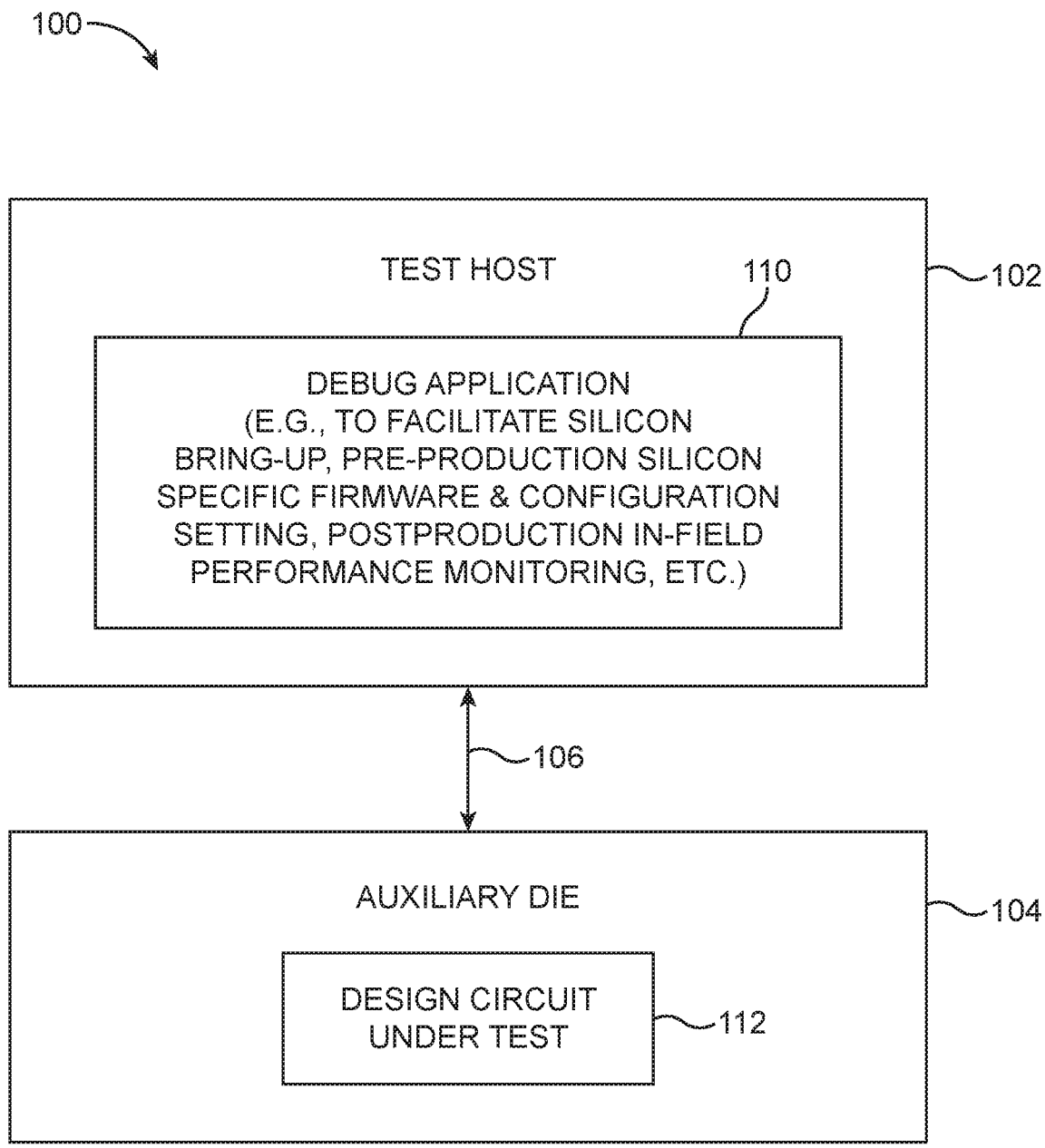
FIG. 1 is a diagram of an illustrative computing system having a test host for performing design for debug (DFD) operations on an auxiliary die in accordance with an embodiment.

FIG. 1 is a diagram of an illustrative computing system such as system 100. As shown in FIG. 1, computing system 100 may include a host processor such as test host 102 that is coupled to an auxiliary die 104. Test host 102 may be used to run a debugging application 110 to help detect defects associated with a design circuit under test 112 formed within auxiliary die 104. In particular, debugging application 110 may be used to support Design for Debug (DFD) operations, which complement conventional functional failure analysis that debugs the CUT according to its functional criteria (i.e., to validate its register transfer level and software/firmware level correctness). In contrast to traditional functional testing, a DFD infrastructure provides additional signal probing and capturing capabilities for tracking specific failures within circuit under test (CUT) 112, which can facilitate silicon bring-up, pre-production silicon specific firmware and configuration setting, post-production in-field performance monitoring, functional error, performance metric profiling, any statistical data gathering and analysis which contributes to system characterization/bandwidth/power, and/or other debugging processes to help reduce test time.

Test host 102 may communicate with auxiliary die 104 via host connection path 106. If test host 102 and auxiliary die 104 are separate components on a printed circuit board (PCB), host connection path 106 may be a PCIe bus, IEEE 802.3 Ethernet bus, Universal Serial Bus (USB), Interlaken bus, Serial RapidIO bus, Common Public Radio Interface (CPRI) bus, Open Base Station Architecture Initiative (OBSAI) bus, and/or other computer bus connection.

In such scenarios, test host 102 may be a host processor, whereas auxiliary die 104 may be a hardware acceleration device that is used for co-processing in big-data, fast-data, or high performance compute (HPC) applications. By offloading computationally intensive tasks from host processor 102 onto one or more coprocessors 104, host processor 102 is freed up to perform other critical processing tasks. The use of hardware accelerators can therefore help deliver improved speeds, latency, power efficiency, and flexibility for cryptography, end-to-end cloud computing, networking, storage, artificial intelligence, autonomous driving, virtual reality, augmented reality, gaming, and other data-centric applications. In such context, coprocessor die 104 may be an application-specific integrated circuit (ASIC), a programmable integrated circuit (e.g., a field-programmable gate array or "FPGA"), a graphics processing unit (GPU), central processing unit (CPU), or other suitable types of processing devices.

If test host 102 and auxiliary die 104 are formed within the same integrated circuit (IC) package, host connection path 106 may be an intra-package interconnection such as the proprietary Advanced Interface Bus (AIB) developed by INTEL Corporation for communicating with transceiver dies or the Universal Interface Bus (UIB) for communicating with on-package memory dies such as the JEDEC JESD235 High Bandwidth Memory (HBM). In such scenarios, test host 102 may serve as a main processor die, while auxiliary die 104 serves as a daughter die such as a transceiver tile, a memory tile, or other types of in-package expansion component.

Figure 2:
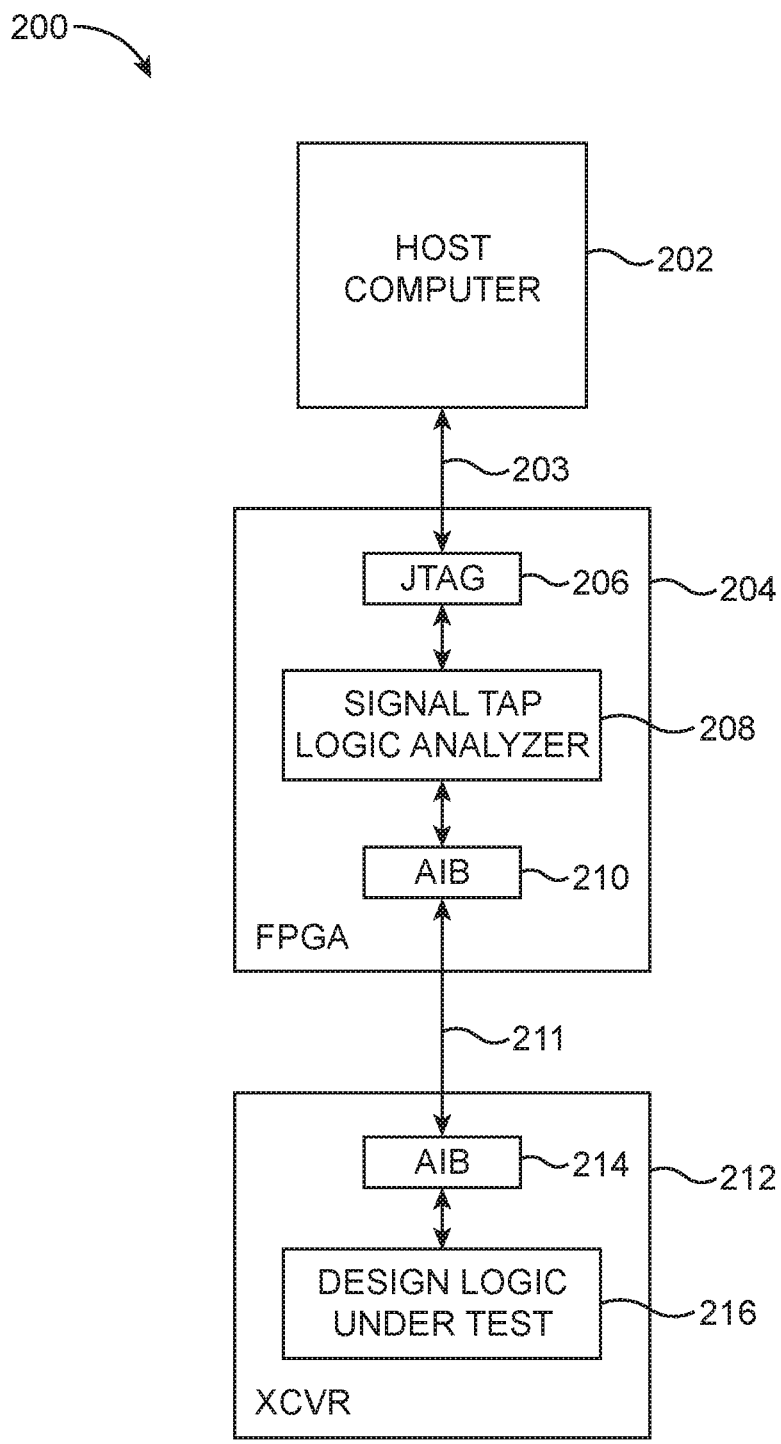
FIG. 2 is a diagram of a test system that includes a field-programmable gate array (FPGA) die having a signal tap logic analyzer configured to perform debugging on a peripheral transceiver die.

FIG. 2 shows one suitable test system 200 that includes a host computer 202, an FPGA 204, and a transceiver die 212. As shown in FIG. 2, FPGA 204 may have a JTAG (Joint Action Test Group) interface block 206 for communicating with host computer 202 via host connection path 203 and an AIB interface block 210 for communicating with transceiver die 212 via connection path 211. Transceiver die 212 may also include its own AIB interface block 214 for communicating with FPGA 204 and design logic under test 216.

Figure 3:
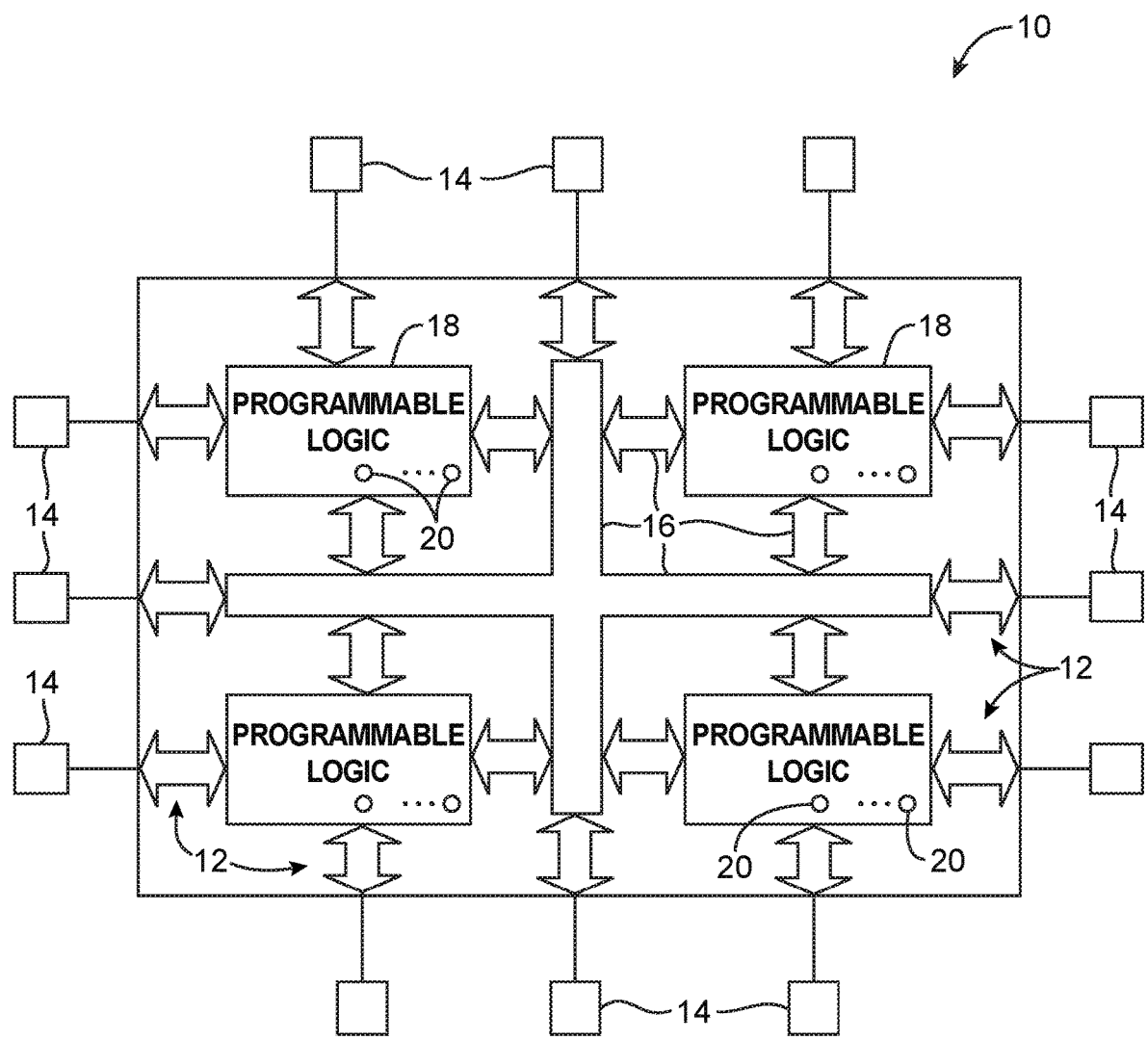
FIG. 3 is a diagram of a programmable integrated circuit in accordance with an embodiment.

FIG. 3 is a diagram of an illustrative programmable integrated circuit 10 (e.g., an FPGA). As shown in FIG. 3, programmable integrated circuit device 10 may have input-output circuitry 12 for driving signals off of device 10 and for receiving signals from other devices via input-output pins 14. Interconnection resources 16 such as global and local vertical and horizontal conductive lines and buses may be used to route signals on device 10. Interconnection resources 16 include fixed interconnects (conductive lines) and programmable interconnects (i.e., programmable connections between respective fixed interconnects). Programmable logic 18 may include combinational and sequential logic circuitry. The programmable logic 18 may be configured to perform a custom logic function.

Programmable integrated circuit 10 contains memory elements 20 that can be loaded with configuration data (also called programming data) using pins 14 and input-output circuitry 12. Thus, the memory elements are sometimes referred to as configuration random-access memory (CRAM) cells. Once loaded, the memory elements each provide a corresponding static control output signal that controls the state of an associated logic component in programmable logic 18.

Referring back to FIG. 2, FPGA 204 is typically provided with an on-chip logic analyzer circuit such as signal tap logic analyzer 208. Signal tap logic analyzer 208 is an embedded functional debugging tool (e.g., reconfigurable or "soft" logic circuitry) configured to probe and capture signals from internal nodes of logic under test 216 during actual run-time, which provides non-intrusive access to signals at internal device nodes without having to physically connect those nodes to input-output pins.

Figure 4:
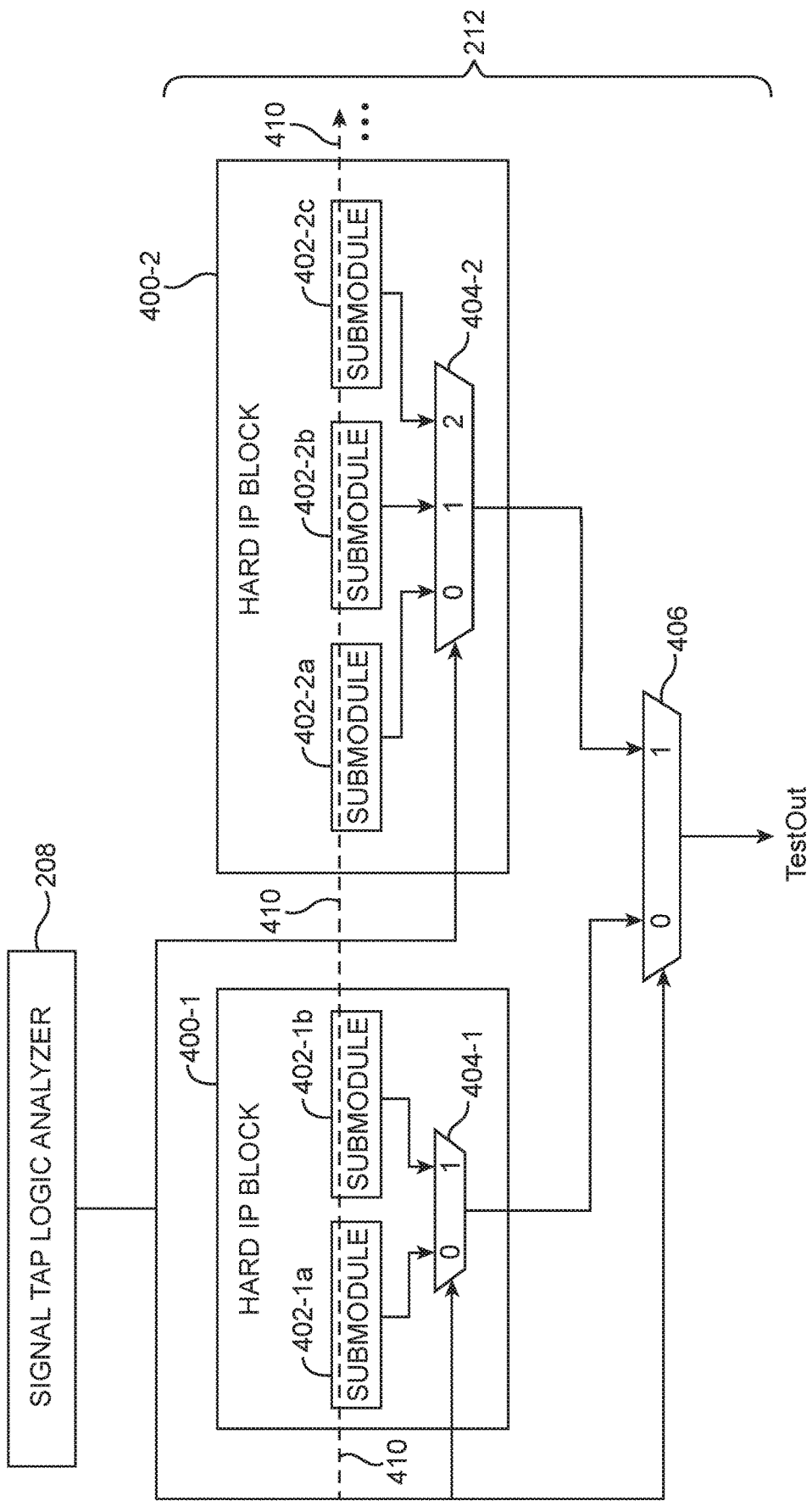
FIG. 4 is a diagram showing how the transceiver die of FIG. 2 includes debugging circuitry controlled by the signal tap logic analyzer and associated soft logic fabric on the FPGA.

Signal tap logic analyzer 208 may be configured to tap into various internal signals of block 216 via path 211 (see, e.g., FIG. 4). As shown in FIG. 4, transceiver die 212 includes various hard intellectual property (IP) blocks such as IP blocks 400-1 and 400-2. Hard IP block 400-1 includes a first submodule 402-1a and a second submodule 402-1b. Hard IP block 400-2 includes a first submodule 402-2a, a second submodule 402-2b, and a third submodule 402-2c. During operation of transceiver die 212, data signal may flow through hard IP blocks 400-1 and 400-2, thus traversing the various submodules as shown by dotted data path 410.

A programmable multiplexer tree is provided for selectively monitoring the signal behavior as the data signals traverse data path 410. For instance, block 400-1 has a first multiplexer 404-1 that can tap into signals from either submodule 402-1a or submodule 402-1b. Similarly, block 400-2 has a second multiplexer 404-2 that can tap into signals from either submodule 402-2a, submodule 402-2b, or submodule 402-2c. The multiplexer tree further includes a third multiplexer 406 for selecting a signal from either multiplexer 404-1 or multiplexer 404-2. The output of multiplexer 406 (i.e., TestOut) may be fed back to the host computer 202 via the AIBs (over path 211) and JTAG interface 206. In particular, each of the multiplexers in the multiplexer tree is controlled by the signal tap logic analyzer 208 and associated soft logic fabric on FPGA 204 via a parallel test bus.

A DFD infrastructure that uses programmable multiplexers driven by an FPGA signal tap logic analyzer, which communicates with a separate host computer via a JTAG interface in the arrangement shown in FIG. 2 has the following shortcomings: (1) it requires additional dedicated hardware connections for the JTAG interface; (2) the sampling frequency of DFD test signals is limited by the maximum frequency of the AIB interface, which is typically slower than the PCIe standard; (3) it requires a substantial amount of FPGA soft logic to implement the remote control and access to the various DFD nodes with the hard IP block submodules; and (4) the DFD probes cannot be used if the FPGA fabric is not yet configured, which limits early silicon bring-up.

Figure 5:
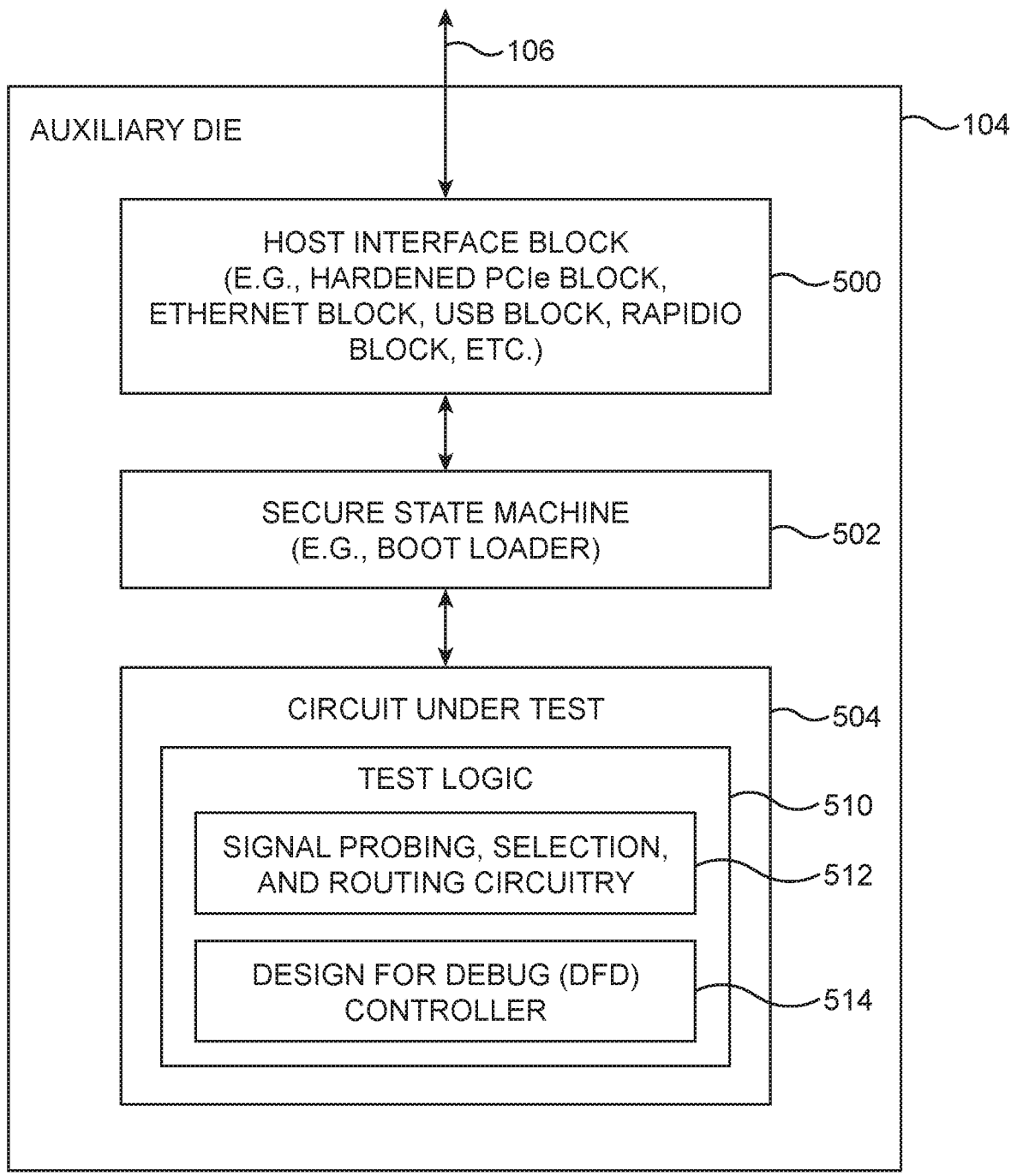
FIG. 5 is a diagram of an illustrative auxiliary die that includes a host protocol interface block configured to communicate with hardened on-chip test logic in accordance with an embodiment.

In accordance with an embodiment, the auxiliary die may leverage an existing host interface block to support DFD operations. FIG. 5 shows how auxiliary die 104 may include a host interface block 500 for passing DFD control and test signals to the circuit under test 504 via a secure state machine 502. Host interface block 500 may be a hardened PCIe interface block, an Ethernet interface block, a USB interface block, a RapidIO interface block, or other computer bus protocol interfacing block. Block 500 is therefore sometimes referred to as a host protocol interface block or a host protocol block. Block 500 may be coupled to the test host via path 106, which serves as the primary data bus between the test host and the auxiliary die.

Figure 6:
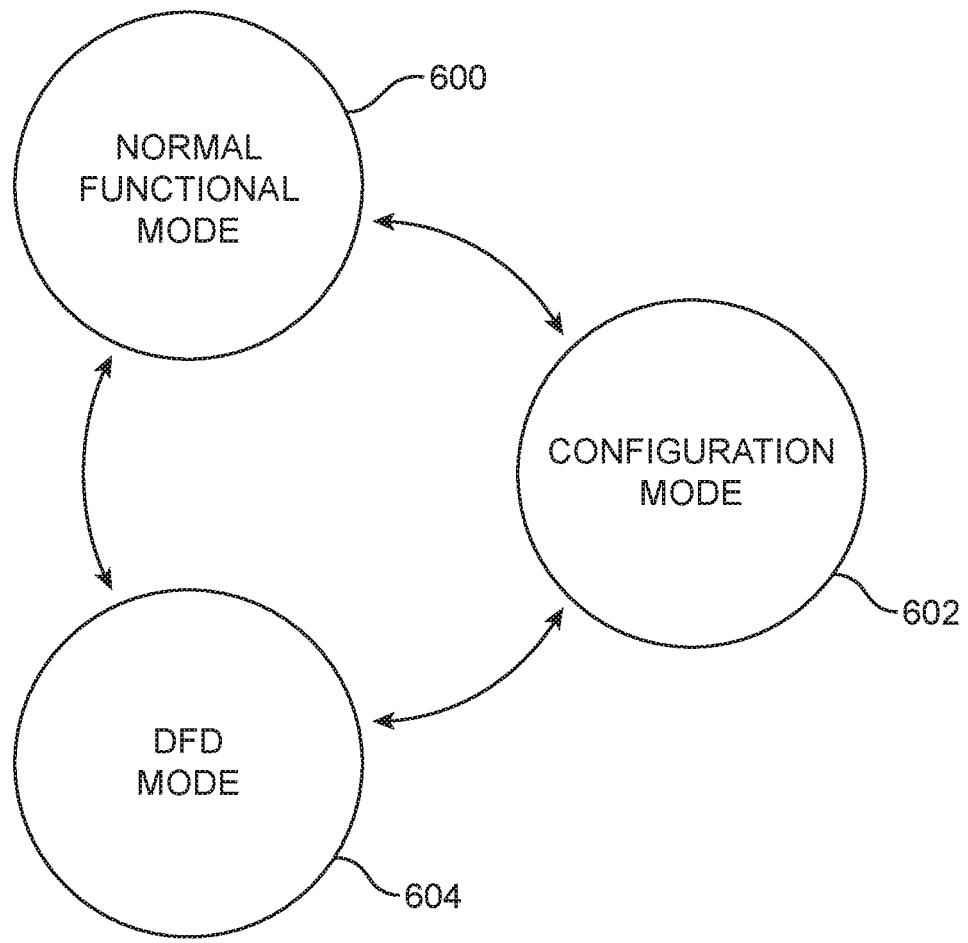
FIG. 6 is a diagram showing how the host protocol interface block shown in FIG. 5 is operable in a normal functional mode, a configuration mode, and also a DFD mode in accordance with an embodiment.

FIG. 6 shows how host interface block 500 may be operable in multiple modes. As shown in FIG. 6, block 500 may be operable in a normal functional mode 600, where normal user signals are conveyed between the test host and the auxiliary die. For example, if the test host is a host processor and if the auxiliary die is a hardware accelerator coprocessor, tasks may be offloaded from the host processor to the auxiliary die during mode 600.

Block 500 may be further operable in a configuration mode 602. During configuration mode 602, the test host may serve as a configuration device for loading configuration data into the auxiliary die. This process in which the primary data bus and protocol block 500 have been leveraged for configuration purposes is sometimes referred to as Configuration via Protocol (CVP).

Block 500 may be further operable in a Design for Debug (DFD) mode 604. During DFD mode 604, the test host may borrow and reuse a large portion of the CVP infrastructure to support DFD operations (e.g., to pass all debugging control and test signals from the test host to circuit under test 504 via host interface block 500). This process in which the primary data bus and protocol block 500 have been leveraged for debugging purposes is therefore sometimes referred to as DFD via Protocol (DVP). Use of protocol block 500 can therefore obviate the need for any additional JTAG ports, which simplifies input-output connectivity.

Referring back to FIG. 5, secure statement machine (SSM) 502 may a tamper-resistant boot loader element for loading an operating system or other device configuration sequence for auxiliary die 104. Circuit under test 504 may also be provided with testing logic 510, which includes signal probing, selection, and routing circuitry 512 that makes up at least part of the DFD infrastructure and a DFD controller 514 (sometimes also referred to as a DFD hub). DFD hub 514 may be a hardened DFD controller that is entirely embedded within the auxiliary die 104, which obviates the need for external soft logic to be properly configured to initiate a DFD cycle.

Figure 7:
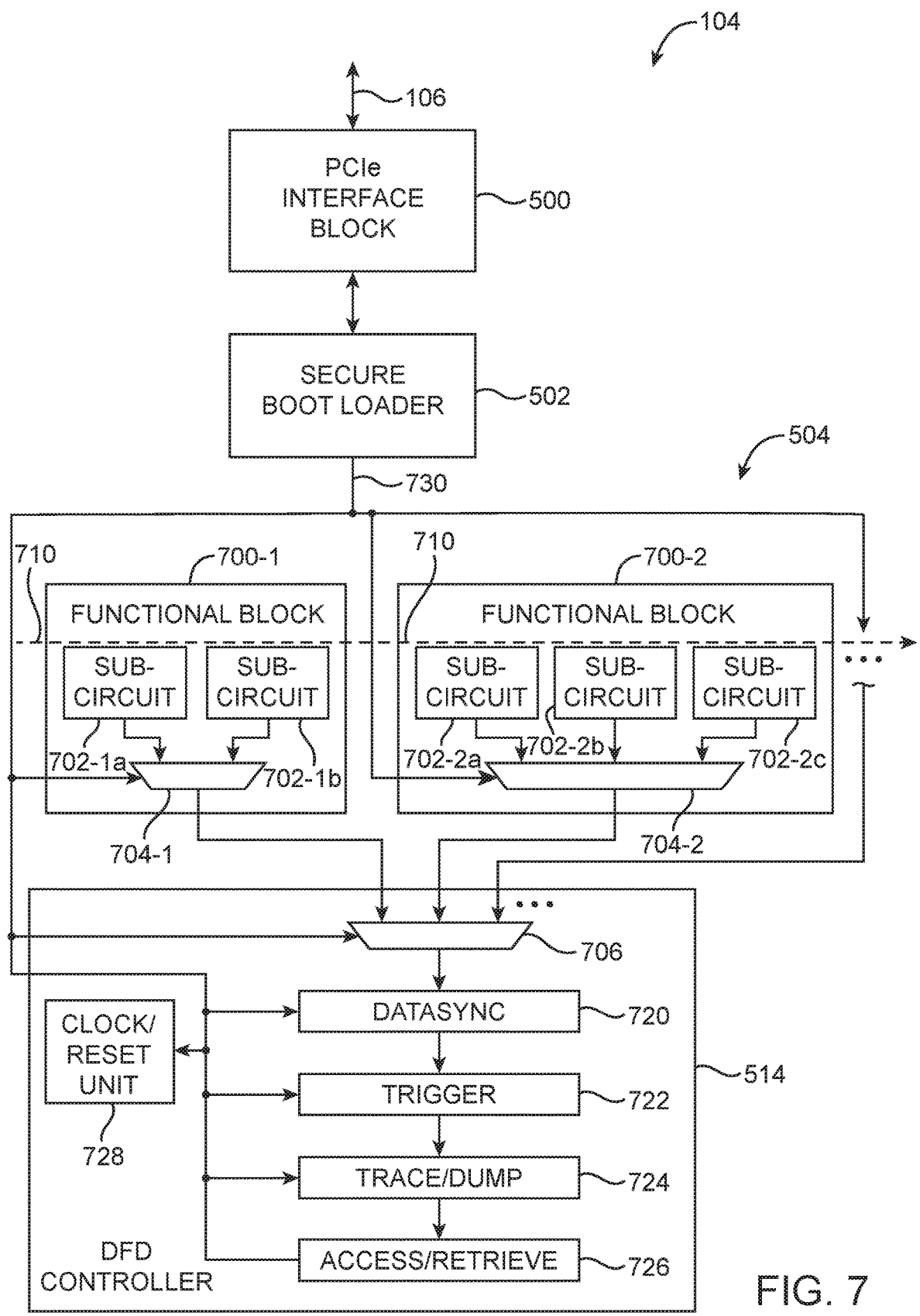
FIG. 7 is a diagram showing how the test logic within the auxiliary die may include a hardened DFD controller that is controlled using the host protocol interface block in accordance with an embodiment.

FIG. 7 shows one suitable implementation of auxiliary die 104. Auxiliary die 104 may be a coprocessor formed as part of the same computing system as a host processor, a secondary processor formed on the same circuit board as a primary processor, or a daughter die formed as within the same multichip package as a main die. In each of these scenarios, the host processor, the primary processor, and the main die each serve as the test host on which the debug application can be run (se FIG. 1).

In the example of FIG. 7, host protocol interface block 500 is implemented as a PCIe interface block. PCIe interface block 500 may serve as a PCIe endpoint configured to communicate with a PCIe root port on the test host. Arranged as such, transaction layer packets (TLPs) that include DFD information may be conveyed between the PCIe root port of the test host and PCIe endpoint of the auxiliary device. Using PCIe TLPs for configuration can also help simplify the auxiliary die driving scheme (since no special memory allocation is needed) while reducing hardware footprint and minimizing the risk of memory corruption. Moreover, PCIe interface block 500 may be advantageous over the AIB interface within transceiver die 212 of FIG. 2 since the maximum data transfer frequency over a PCIe link is generally higher than that over an AIB link. Note that the secure boot loader 502 interposed between interface block 500 and circuit under test 504 is entirely optional and can be excluded to help further reduce cost in arrangements where a boot loader is not required.

Circuit under test 504 may include multiple functional blocks such as blocks 700-1 and 700-2. Each functional block 700 may serve a different logical function and may include its own set of subcircuits. Functional block 700-1 may include a first subcircuit 702-1*a* and a second subcircuit 702-1*b*, whereas functional block 700-2 may include a first subcircuit 702-2*a*, a second subcircuit 702-2*b*, and a third subcircuit 702-2*c*. For example, if block 700-1 were to implement a FIFO circuit, subcircuit 702-1*a* may be a memory array, whereas subcircuit 702-1*b* may be logic for tracking the various read and write pointers required for proper FIFO operation. Although only two functional blocks are shown in FIG. 7, circuit under test 504 may include any suitable number of hardened IP blocks. In general, circuit under test 504 may include any type of logic circuit, storage circuit, programmable circuit, or application-specific circuit for which debugging might be required.

During operation of auxiliary die 104, data signal may flow through functional logic blocks 700-1 and 700-2, thus traversing the various subcircuits as shown by dotted data path 710. A programmable multiplexing tree may be provided for selectively probing various internal nodes of interest as the data signals traverse data path 710. For instance, block 700-1 has a first multiplexer 704-1 that can access signals from either subcircuit 702-1*a* or subcircuit 702-1*b*. Similarly, block 700-2 has a second multiplexer 704-2 that can access signals from either subcircuit 702-2*a*, subcircuit 702-2*b*, or subcircuit 702-2*c*.

Signals output from multiplexer 704-1, multiplexer 704-2, and yet other multiplexers from other functional blocks within CUT 504 may be routed to multiplexer 706 within DFD controller 514. DFD controller 514 may further include a clock selection/reset unit 728, a data synchronization component such as data sync circuit 720, and circuitry for supporting the main DFD components such as a signal triggering circuit 722, a signal tracing/dumping circuit 724, and a signal access/retrieval circuit 726. Unit 728 may be configured to select the desired clock source for capturing the test signals and may also be used for resetting controller 514. The functional blocks 700 and the DFD operations within DFD controller 514 may operate in different clock domains, so data synchronization circuit 720 is configured to synchronize signals traversing the two different clock domains.

While the configuration of the various multiplexers in the multiplexing tree determine which signal locations are being probed, DFD trigger circuit 722 sets the triggering conditions that determine when the probed signals are to be captured. DFD trace circuit 724 manages the storage of trace data (e.g., captured signals may be stored into a local on-chip random access memory device). DFD access circuit 726 manages the retrieval of the trace data stored within trace circuit 724. Embedding all the main DFD components (i.e., the trigger, trace, and access components) locally within the auxiliary die 104 enables DFD access without requiring any other external FPGA fabric to be configured. This also provides improved multi-level security access control to the DFD proves since the DFD controller does not have to be exposed to any FPGA fabric.

All of the multiplexers in the multiplexing tree (e.g., multiplexers 704-1, 704-2, and 706) and all of the embedded DFD components within controller 514 may be controlled by the test host via signals conveyed through PCIe interface block 500 (e.g., via path 730). Path 730 may be shared between the Configuration via Protocol (CVP) process and the DFD via Protocol (DVP) process. In other words, the test host can control the selection of each multiplexer, the trigger conditions, and when the captured signals are to be fed back to the test host for further analysis. This enables easier remote DFD access, which allows end customers to perform device production debug, statistical data collection, and remote device monitoring in a data center.

Figure 8:
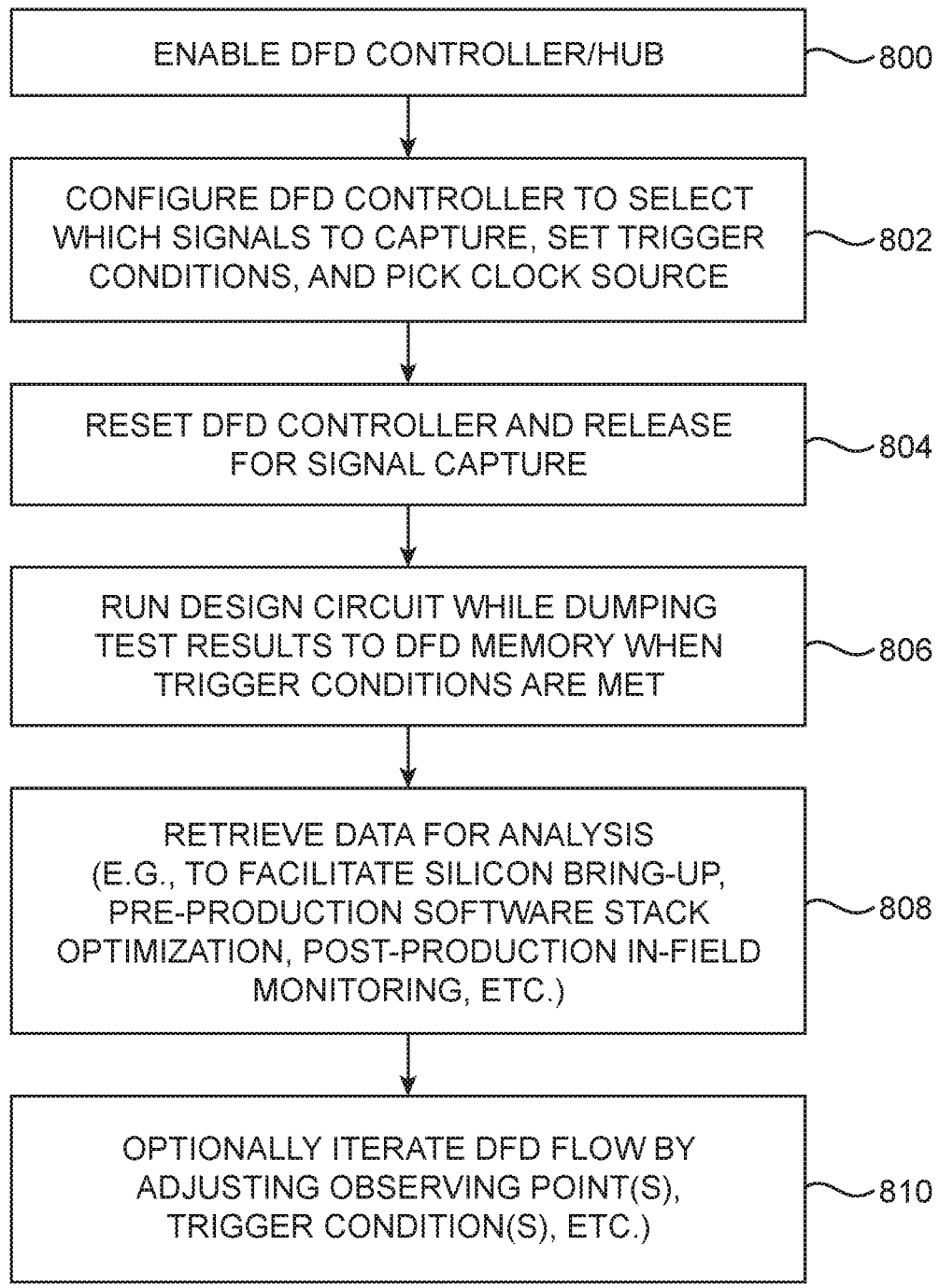
FIG. 8 is a flow chart of illustrative steps for operating the auxiliary die to carry out DFD operations in accordance with an embodiment.

FIG. 8 is a flow chart of illustrative steps for operating the test host and the auxiliary die to carry out DVP operations.

At step 800, the DFD controller may be enabled (e.g., by sending enabling commands from the test host to the DFD hub via the protocol interface block).

At step 802, the DFD controller may be configured to select which signals to capture (e.g., by sending appropriate select signals from the test host to the multiplexer tree via the protocol interface block), to set desired trigger conditions (e.g., by sending appropriate control signals from the test host to DFD trigger component 722), and to pick a desired clock source for capturing test signals (e.g., by sending appropriate control signals from the test host to clock selection unit 728). At step 804, the DFD controller may be reset and released for signal capture (e.g., by using the test host to direct reset unit 728 to reset DFD hub 514 via the protocol interface block).

At step 806, the design circuit under test may be allowed to run normally while dumping test results to the DFD trace component 724. Trace data is only captured when the predetermined signal trigger conditions are met. The captured data is then dumped into the embedded trace memory within the DFD controller.

After a sufficient amount of test time has elapsed, the trace data may be retrieved from the trace memory. For instance, the test host may direct the DFD access component 726 to send back the stored trace data via the protocol interface block. Data retrieved back at the test host can then be used to facilitate silicon bring-up, pre-production software stack optimization, post-production in-field performance monitoring, functional error, performance metric profiling, any statistical data gathering and analysis which contributes to system characterization/bandwidth/power, and/or other debugging processes to help reduce test time.

At step 810, steps 800-808 may optionally be iterated to perform additional DFD cycles by adjusting the observing points (e.g., by reconfiguring the multiplexer selection), by adjusting one or more triggering conditions, by adjusting the test duration, by selecting a different clock source for signal capturing purposes, or by making other tweaks to the DVP process.

Although the methods of operations are described in a specific order, it should be understood that other operations may be performed in between described operations, described operations may be adjusted so that they occur at slightly different times or described operations may be distributed in a system which allows occurrence of the processing operations at various intervals associated with the processing, as long as the processing of the overlay operations are performed in a desired way.

EXAMPLES

The following examples pertain to further embodiments.

Example 1 is an integrated circuit die, comprising: a protocol interface block configured to communicate with an external host processor during normal functional mode; a circuit under test coupled to the protocol interface block; and a debug controller configured to perform design for debug (DFD) operations on the circuit under test, wherein the DFD operations complement functional testing to isolate a failure on the circuit under test, and wherein the debug controller is further configured to receive control signals from the external host processor via the protocol interface block during a debug mode when the DFD operations are performed.

Example 2 is the integrated circuit die of example 1, optionally further comprising a secure boot loader interposed between the protocol interface block and the debug controller.

Example 3 is the integrated circuit die of any one of examples 1-2, wherein the protocol interface block is optionally further configured to receive configuration data for programming the circuit under test during device configuration mode.

Example 4 is the integrated circuit die of any one of examples 1-3, wherein the protocol interface block optionally comprises a Peripheral Component Interconnect Express (PCIe) interface block.

Example 5 is the integrated circuit die of any one of examples 1-4, wherein the protocol interface block optionally comprises an IEEE 802.3 Ethernet interface block.

Example 6 is the integrated circuit die of any one of examples 1-5, wherein the circuit under test optionally comprises a multiplexing tree configured to select which signals to probe in the circuit under test during the DFD operations, and wherein the multiplexing tree is further configured to receive control signals from the protocol interface block.

Example 7 is the integrated circuit die of any one of examples 1-6, wherein the debug controller optionally comprises a design for debug trigger component configured to determine when signals are captured from the circuit under test during the DFD operations, and wherein the design for debug trigger component is further configured to receive control signals from the protocol interface block.

Example 8 is the integrated circuit die of example 7, wherein the debug controller optionally further comprises a design for debug trace component configured to store the captured signals from the circuit under test during the DFD operations, and wherein the design for debug trace component is further configured to receive control signals from the protocol interface block.

Example 9 is the integrated circuit die of example 8, wherein the debug controller optionally further comprises a design for debug access component configured to retrieve the stored signals from the design for debug trace component during the DFD operations, and wherein the design for debug access component is further configured to receive control signals from the protocol interface block.

Example 10 is the integrated circuit die of any one of examples 1-9, wherein the circuit under test is optionally operable in a first clock domain, wherein the debug controller is optionally operable is a second clock domain that is different than the first clock domain, and wherein the debug controller optionally comprises a data synchronization circuit for synchronizing signals traversing from the first clock domain into the second clock domain.

Example 11 is the integrated circuit die of any one of examples 1-10, wherein the integrated circuit die optionally comprises a transceiver die, and wherein the external host processor optionally comprises a programmable integrated circuit.

Example 12 is the integrated circuit die of any one of examples 1-11, wherein the integrated circuit die optionally comprises a hardware accelerator coprocessor configured to accelerate tasks offloaded from the external host processor.

Example 13 is a method of operating an integrated circuit that includes a protocol interface block and a circuit under test, comprising: during a functional mode, using the protocol interface block to receive data signals from an external host processor and to output the received data signals to the circuit under test; during a configuration mode, using the protocol interface block to receive configuration signals from the external host processor and to program the circuit under test; and during a debug mode, using the protocol interface block to receive test control signals for orchestrating design for debug (DFD) operations on the circuit under test.

Example 14 is the method of example 13, wherein the integrated circuit further includes a design for debug (DFD) controller, the method optionally further comprising using the protocol interface block to configure the DFD controller to select which signals to capture during the DFD operations.

Example 15 is the method of example 14, optionally further comprising using the protocol interface block to configure the DFD controller to set trigger conditions that determine when signals are captured during the DFD operations.

Example 16 is the method of example 15, optionally further comprising storing captured signals in memory within the DFD controller.

Example 17 is the method of example 16, optionally further comprising using the protocol interface block to retrieve the stored signals from the memory within the DFD controller and using the retrieved signals to facilitate with silicon bring-up, pre-production silicon specific firmware and configuration setting, or post-production in-field performance monitoring.

Example 18 is a system comprising: a host processor, wherein a debug application runs on the host processor; and an integrated circuit die having a host interface block configured to communicate with the debug application on the host processor, wherein the integrated circuit die comprises a design for debug (DFD) hub with trigger, trace, and access components for carrying out design for debug (DFD) operations on the integrated circuit die.

Example 19 is the system of example 18, wherein the host interface block optionally comprises a hardened protocol communications block selected from the group consisting of: a Peripheral Component Interconnect Express (PCIe) block, an IEEE 802.3 Ethernet block, a Universal Serial Bus (USB) block, an Interlaken block, a RapidIO block, a Common Public Radio Interface (CPRI) block, and an Open Base Station Architecture Initiative (OBSAI) block.

Example 20 is the system of any one of examples 18-19, wherein the host processor is optionally a field-programmable gate array (FPGA), and wherein the integrated circuit die is optionally a transceiver die that is formed within the same package as the FPGA.

Example 21 is the system of any one of examples 18-20, wherein the integrated circuit die is optionally a hardware accelerator coprocessor configured to accelerate tasks offloaded from the host processor.

For instance, all optional features of the apparatus described above may also be implemented with respect to the method or process described herein. The foregoing is merely illustrative of the principles of this disclosure and various modifications can be made by those skilled in the art. The foregoing embodiments may be implemented individually or in any combination.

What is claimed is:

1. An integrated circuit die, comprising:
   a circuit under test;
   a protocol interface block configured to communicate with an external host processor during normal functional mode and configured to receive configuration data for programming the circuit under test during a device configuration mode; and
   a debug controller configured to perform design for debug (DFD) operations on the circuit under test, wherein the debug controller is further configured to receive control signals from the external host processor via the protocol interface block during a debug mode when the DFD operations are performed, and wherein the protocol interface block reuses the same communications protocol during the device configuration mode and the debug mode.

2. The integrated circuit die of claim 1, further comprising a secure boot loader interposed between the protocol interface block and the debug controller.

3. The integrated circuit die of claim 1, wherein the communications protocol that is reused for both the device configuration mode and the debug mode comprises Peripheral Component Interconnect Express (PCIe).

4. The integrated circuit die of claim 1, wherein the communications protocol that is reused for both the device configuration mode and the debug mode comprises IEEE 802.3 Ethernet.

5. The integrated circuit die of claim 1, wherein the circuit under test comprises a multiplexing tree configured to select which signals to probe in the circuit under test during the DFD operations, and wherein the multiplexing tree is further configured to receive the control signals.

6. The integrated circuit die of claim 1, wherein the debug controller comprises a design for debug trigger component configured to determine when signals are captured from the circuit under test during the DFD operations, and wherein the design for debug trigger component is further configured to receive the control signals.

7. The integrated circuit die of claim 6, wherein the debug controller further comprises a design for debug trace component configured to store the captured signals from the circuit under test during the DFD operations, and wherein the design for debug trace component is further configured to receive the control signals.

8. The integrated circuit die of claim 7, wherein the debug controller further comprises a design for debug access component configured to retrieve the captured signals stored on the design for debug trace component, and wherein the design for debug access component is further configured to receive the control signals.

9. The integrated circuit die of claim 1, wherein the circuit under test is operable in a first clock domain, wherein the debug controller is operable is a second clock domain that is different than the first clock domain, and wherein the debug controller comprises a data synchronization circuit for synchronizing signals traversing from the first clock domain into the second clock domain.

10. The integrated circuit die of claim 1, wherein the integrated circuit die comprises a transceiver die, and wherein the external host processor comprises a programmable integrated circuit.

11. The integrated circuit die of claim 1, wherein the integrated circuit die comprises a hardware accelerator coprocessor configured to accelerate tasks offloaded from the external host processor.

12. A method of operating an integrated circuit that includes a protocol interface block and a circuit under test, comprising:
   during a functional mode, using the protocol interface block to receive data signals from an external host processor and to output the received data signals to the circuit under test;
   during a configuration mode, using the protocol interface block to receive configuration signals from the external host processor and to program the circuit under test; and during a debug mode, using the protocol interface block to receive test control signals for orchestrating design for debug (DFD) operations on the circuit under test without using a dedicated test interface standard.

13. The method of claim 12, wherein the integrated circuit further includes a design for debug (DFD) controller, the method further comprising using the protocol interface block to configure the DFD controller to select which signals to capture during the DFD operations.

14. The method of claim 13, further comprising using the protocol interface block to configure the DFD controller to set trigger conditions that determine when the signals are captured during the DFD operations.

15. The method of claim 14, further comprising storing captured signals in memory within the DFD controller.

16. The method of claim 15, further comprising using the protocol interface block to retrieve the captured signals stored in the memory and using the captured signals retrieved from the memory to facilitate with silicon bring-up, pre-production silicon specific firmware and configuration setting, or post-production in-field performance monitoring.

17. A system comprising:
a host field-programmable gate array processor, wherein a debug application runs on the host field-programmable gate array processor; and
a transceiver die having a host interface block configured to communicate with the debug application, wherein the transceiver die comprises a design for debug (DFD) hub with trigger, trace, and access components for carrying out design for debug (DFD) operations on the transceiver die, and wherein the transceiver die and the host field-programmable gate array processor are formed in a single package.

18. The system of claim 17, wherein the host interface block comprises a hardened protocol communications block selected from the group consisting of: a Peripheral Component Interconnect Express (PCIe) block, an IEEE 802.3 Ethernet block, a Universal Serial Bus (USB) block, an Interlaken block, a RapidIO block, a Common Public Radio Interface (CPRI) block, and an Open Base Station Architecture Initiative (OBSAI) block.

19. The method of claim 12, further comprising:
reusing the same communications protocol during the configuration mode and the debug mode.

* * * * *